(No Model.)

2 Sheets—Sheet 1.

J. W. DRESCHER.
MOTOR SLED.

No. 509,595.

Patented Nov. 28, 1893.

Witnesses:

Inventor:
Julius William Drescher
By Lotz & Kennedy
Attorneys.

THE NATIONAL LITHOGRAPHING COMPANY,
WASHINGTON, D. C.

(No Model.) 2 Sheets—Sheet 2.
J. W. DRESCHER.
MOTOR SLED.
No. 509,595. Patented Nov. 28, 1893.
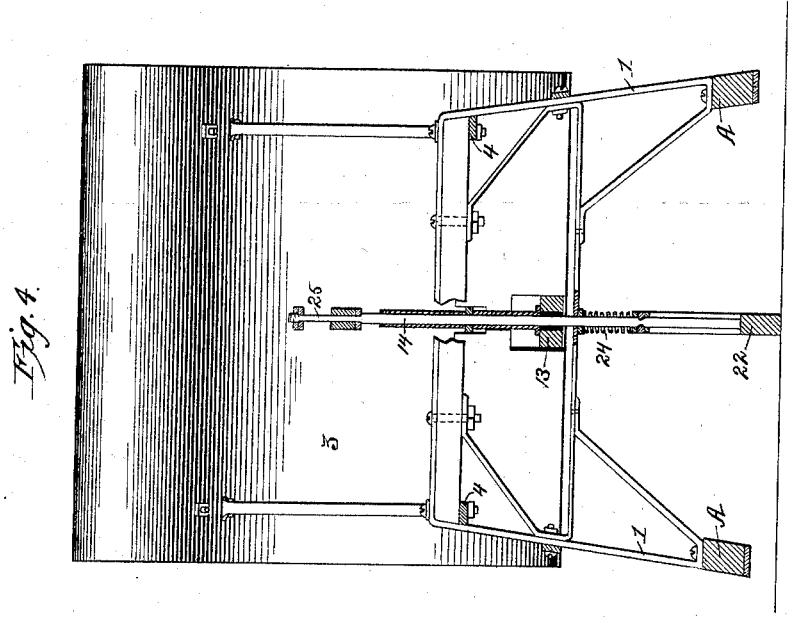
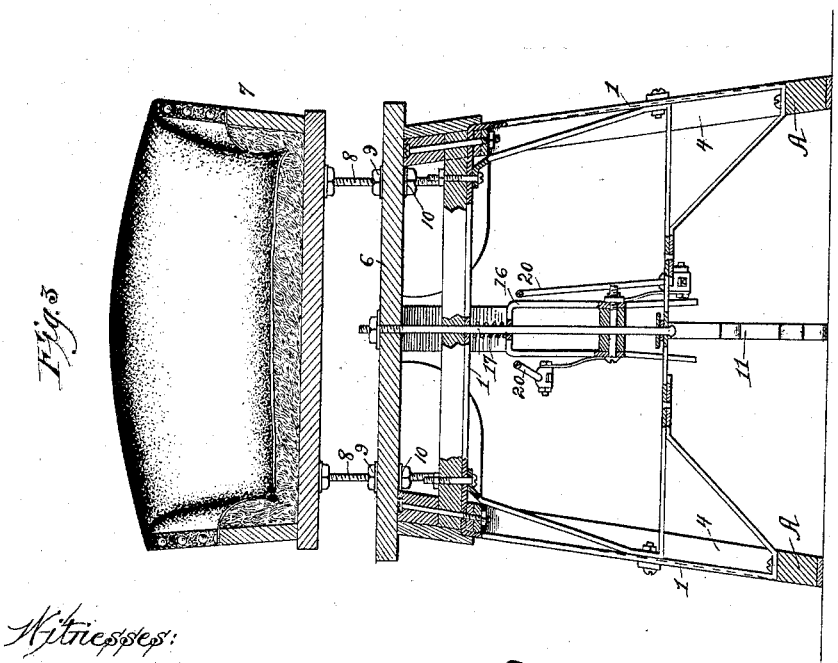

UNITED STATES PATENT OFFICE.

JULIUS WILLIAM DRESCHER, OF MINNEAPOLIS, MINNESOTA.

MOTOR-SLED.

SPECIFICATION forming part of Letters Patent No. 509,595, dated November 28, 1893.

Application filed March 9, 1893. Serial No. 465,370. (No model.)

*To all whom it may concern:*

Be it known that I, JULIUS WILLIAM DRESCHER, a citizen of the United States, residing at Minneapolis, in the county of Hennepin and State of Minnesota, have invented certain new and useful Improvements in Motor-Sleds; and I do hereby declare the following to be a full, clear, and exact description of the invention, such as will enable others skilled in the art to which it appertains to make and use the same.

This invention relates to a novel construction in what I term a motor sled, the object being to provide a sled that can be propelled by the application of foot power and also guided by hand.

The invention consists in the features of construction and combinations of parts hereinafter fully described and specifically claimed.

Figure 1:
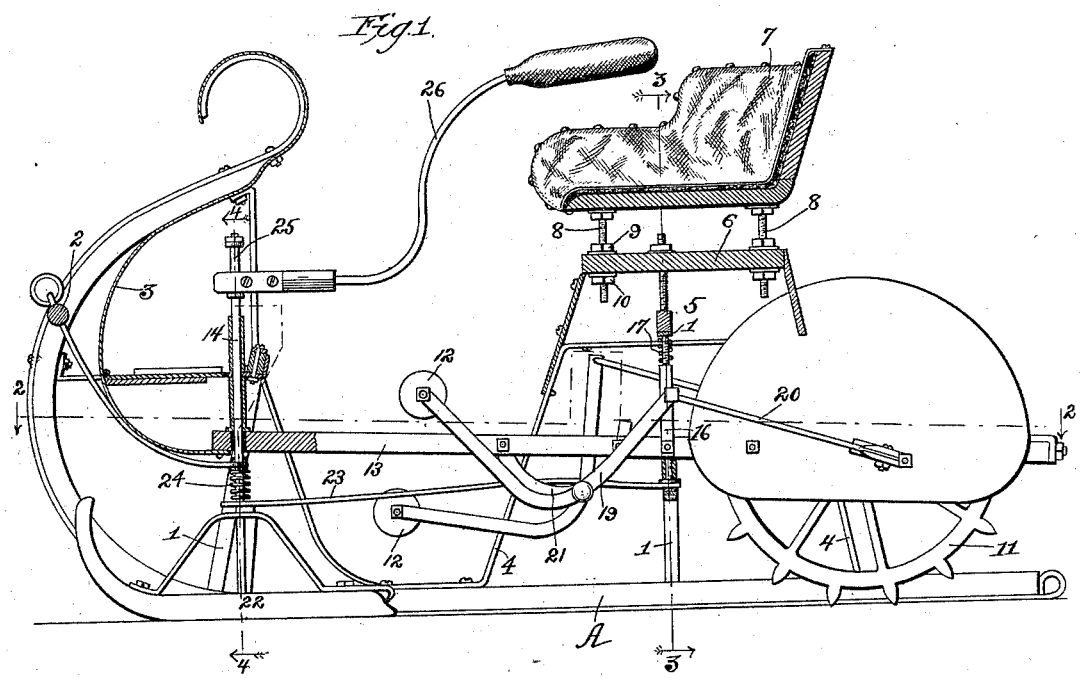
Figure 2:
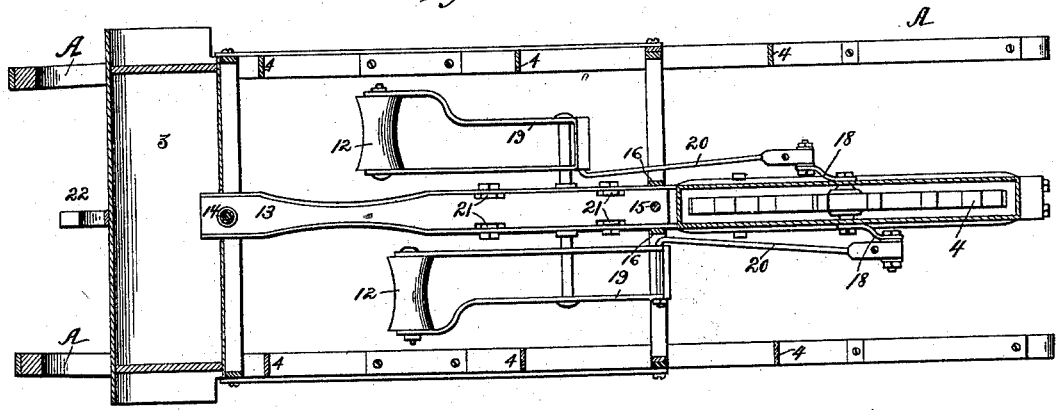

In the accompanying drawings illustrating my invention,—Figure 1 is a central vertical section, partly in elevation, of a sled constructed in accordance with my invention. Fig. 2 is a horizontal section on the line 2—2 of Fig. 1. Fig. 3 is a transverse section on line 3—3, Fig. 1. Fig. 4 is a transverse section on line 4—4 Fig. 1.

Referring now to said drawings, A indicates the runners of the sled fastened together by suitable cross pieces 1, cross or draft bar 2 and snow guard 3 to form the frame-work of the sled. Upon brackets 4 mounted upon the runners are secured side plates 5 upon which is mounted a platform 6. The seat 7 of the sled is mounted upon the platform 6 by means of screws 8 that are rigidly secured to the bottom of the seat 7 and are adjusted upon the platform 6 by means of the nuts 9 and 10, said nuts 9 being located above the platform to support the seat, while the nuts 10 are located beneath the platform to prevent the seat from rising.

The devices for propelling the sled consist of a toothed or traction wheel 11 and the propelling treadles 12, which devices are supported upon a movable bar or frame 13. The said frame 13 is loosely connected at its forward end with the upright steering shaft of the sled so as to swing up and down upon such steering shaft 14, while near its rear end said frame 13 is guided by an upright rod 15, said rod 15 passing through the frame 13. The said rod 15 is rigidly secured at its lower end to one of the cross pieces 1 of the sled frame, while at its upper end it is secured to the platform 6 of the sled, as shown. The said frame is provided with a bail 16 pivoted thereto at its lower end and provided with an opening at its upper end through which the rod 15 passes, and between the upper end of this bail and one of the cross pieces 1 of the sled frame is located a spring 17 that encircles the rod 15, and, acting by expansion, exerts a tension upon the frame 13 to force the same downwardly. The rear end of the frame 13 is bifurcated and a traction wheel 11 is mounted upon bearings thereon and between the bifurcated ends thereof, and is provided with cranks 18 connected with the treadle levers 19 by links 20, which treadle levers 19 are pivotally supported upon brackets 21 upon the said frame 13. The said treadle levers 19 carry the treadles 12 which are located in position to be operated by the feet of a person occupying the seat 7, which upon being operated serve to revolve the traction wheel 11. From the foregoing description it will be seen that said traction wheel is supported upon a movable frame which is held downwardly under a yielding tension, so that the traction wheel 11 carried by said frame will at all times be held in contact with the ice or snow covered ground, it being noted that as the runners pass over unequal surfaces, by the yielding spring tension upon the frame 13, said frame will always accommodate itself to such inequalities and hold the wheel 11 at all times in contact with the snow or ice covered ground, so that whenever said wheel is rotated by the devices therefor it will serve to propel the sled.

The devices for steering the sled embrace a steering runner 22 that is carried by the steering shaft 14, said steering shaft passing loosely through bearings in the cross pieces 1 of the said frame and capable of moving up and down in its bearings. The steering shaft 14 is held against twisting or displacement at its lower end by reason of a bar 23 through the forward end of which the steering shaft 14 passes, and which is connected at its rear end with one of the cross pieces 1 of the sled frame. This bar 23 serves to prevent the lower end of the steering shaft 14 from being thrown back, for it will be noted that the steering runner 22 when striking stones or other projections will be subject to considerable strain, which might throw the lower end of the steering shaft 14 back, or strain it unduly.

To hold the steering runner downwardly and at all times in contact with the ground I arrange a spring 24 between the bar 23 and one of the cross pieces 1 of the sled of the said frame, and the said spring 24 acting by expansion serves to hold the steering runner down under tension in an obvious manner. The upper end of the steering shaft 14 is flattened, as shown at 25, and the steering handle 26 is provided with a slotted end that receives the flattened portion of the steering shaft loosely, so that the handle 26 and steering shaft 14 have a pivotal as well as sliding connection with each other, which permits the handle 26 to be manipulated, while the engagement of the flattened portion 25 of the steering shaft 14 with the slotted end of the handle 26 insures the turning of the steering shaft when the handle is swung.

I claim as my invention—

A motor sled comprising a sled frame and runners, a bar 13 pivoted at its forward end to a rod 14, a traction wheel carried by said bar, devices for rotating said traction wheel, devices for holding said traction wheel down under tension, a steering runner 22 carried by a revoluble shaft 14 movable longitudinally in bearings upon the frame of the sled, a spring for holding said steering runner down under tension, a handle 26 connected with said shaft 14 for turning the same, and a seat adjustably supported upon the sled frame, substantially as described.

In testimony whereof I affix my signature in presence of two witnesses.

JULIUS WILLIAM DRESCHER.

Witnesses:
W. F. EBERHARDT,
EDW. F. L. BLECKEN.